United States Patent [19]

Anderkay

[11] 4,066,058
[45] Jan. 3, 1978

[54] VIBRATION ISOLATION SYSTEM

[75] Inventor: Glenn Allan Anderkay, Waterloo, Iowa

[73] Assignee: Deere & Company, Moline, Ill.

[21] Appl. No.: 685,455

[22] Filed: May 12, 1976

[51] Int. Cl.² .................... E04B 1/99; F02B 77/00
[52] U.S. Cl. .................... 123/198 E; 181/207
[58] Field of Search ............ 123/198 E, 195 C, 195 S; 181/33 K, 33 Q, 33 A; 296/35 R; 277/211

[56] References Cited

U.S. PATENT DOCUMENTS

| | | | |
|---|---|---|---|
| 1,929,626 | 10/1933 | DeForest | 181/33 K |
| 2,607,331 | 8/1952 | Wefing | 181/33 K |
| 2,724,378 | 11/1955 | Welloran | 123/198 E |
| 2,831,378 | 4/1958 | Matey et al. | 181/33 A |
| 3,117,054 | 1/1964 | Antonocci | 181/33 A |
| 3,396,712 | 8/1968 | Sakraida | 123/198 E |
| 3,656,466 | 4/1972 | Dzus, Jr. | 123/198 E |
| 3,773,142 | 11/1973 | Bragg et al. | 123/198 E X |
| 3,822,763 | 7/1974 | Adams et al. | 123/198 E X |
| 3,866,708 | 2/1975 | Rudszinat et al. | 181/33 K X |

FOREIGN PATENT DOCUMENTS 2,317,246  10/1974  Germany ................ 181/33 K

Primary Examiner—Charles J. Myhre
Assistant Examiner—Ira S. Lazarus

[57] ABSTRACT

A vibration isolation system for a cover mountable on a vibratable engine includes a plurality of resilient grommets positioned about a plurality of stripper bolts which are inserted into the cover and through a resilient sealing gasket to threadedly secure the cover to the engine. The grommet and gasket have spring rates within a predetermined range of each other to provide maximum isolation of the cover from the engine.

54 Claims, 7 Drawing Figures

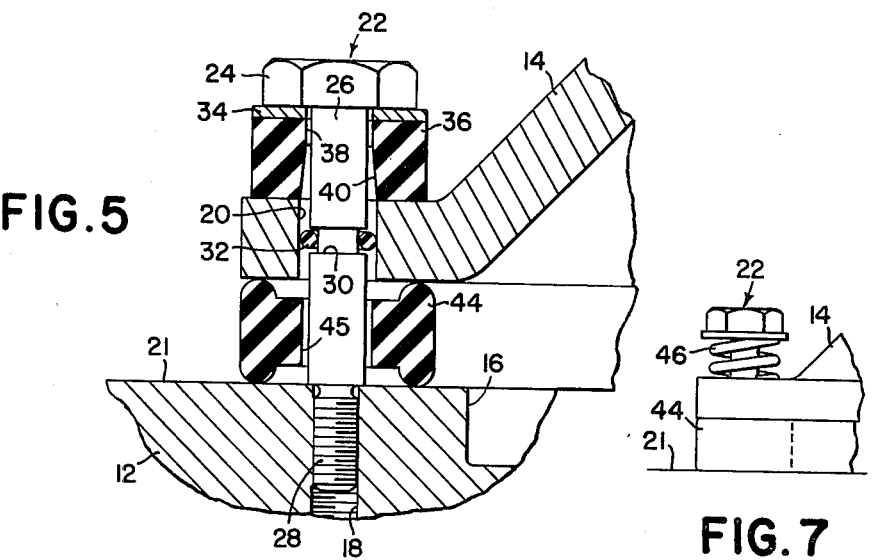
FIG. 5
FIG. 7
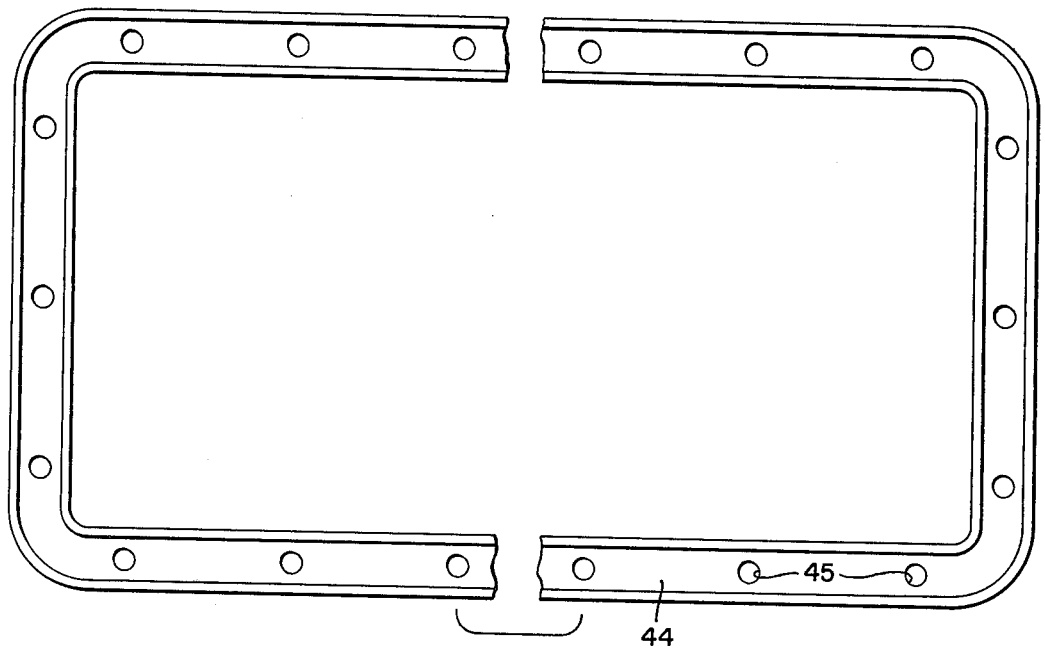
FIG. 6

VIBRATION ISOLATION SYSTEM

BACKGROUND OF THE INVENTION

The present invention relates generally to systems for isolating covers from vibratable bases and more particularly to a system for isolating a cover by means of grommets and a gasket having predetermined spring rates.

In the past, most vibration isolation systems have relied on trial and error methods of isolation by adding different materials between a cover and its associated vibratable base. Some attempts have been made to reduce bolt transmitted vibrations by using the same resilient material in washers between the bolt heads and the cover as in the gaskets. While this has helped, it has resulted in systems which have not maximized isolation and which were subject to seal leaking until the washers were compressed to a point where they did not significantly aid isolation.

SUMMARY OF THE INVENTION

The present invention provides a vibration isolation system wherein the spring rate of grommets between the bolt heads and the cover and the spring rate of the gasket between the cover and the base are selected within a predetermined range so as to maximize vibration isolation of the cover as well as the sealing efficiency of the gasket.

The above and additional advantages of the present invention will become apparent to those skilled in the art from a consideration of the following detailed description of the preferred embodiments when taken in conjunction with the accompanying drawings.

BRIEF DESCRIPTION OF THE DRAWINGS

FIG. 5 is a cross-sectional view of an assembly incorporating an alternate embodiment of the present invention;

FIG. 6 is a top view of an alternate embodiment of the gasket incorporated in the present invention; and FIG. 7 is a cross-sectional view of a further alternate embodiment.

DESCRIPTION OF THE PREFERRED EMBODIMENT

Figure 1:
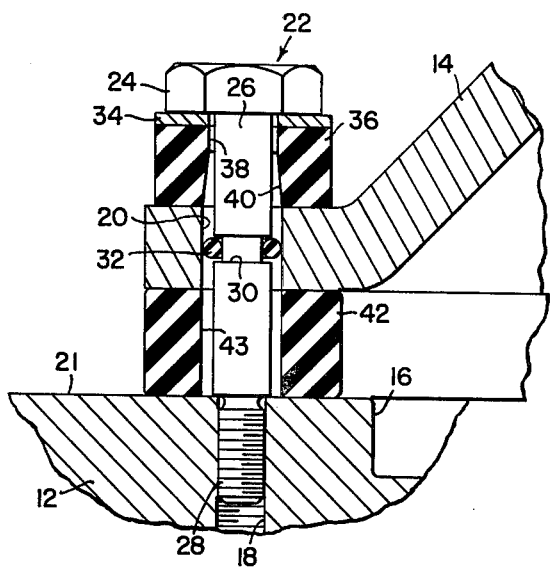
FIG. 1 is a cross-sectional view of an assembly incorporating the preferred embodiment of the present invention.

Referring now to FIG. 1, therein is shown a cross-section of one of a plurality of vibration isolation assemblies generally designated by the numeral 10. Also shown in FIG. 1 is a vibratable base member 12 which may be the engine of a conventional vehicle power plant (not shown) and a spaced apart cover 14 which may be an oil pan, rocker arm cover, or intake air cover.

The base member 12 has a passageway 16 provided therein which is encircled by a plurality of threaded holes 18 (only one shown) and the cover 14 is provided with a plurality of clearance holes 20 (only one shown) matching the pattern of threaded holes 18. The cover 14 is secured to the base member 12 against a mounting surface 21 by stripper bolts 22 (only one shown) passing through the clearance holes 20 and threaded into the threaded holes 18.

Figure 2:
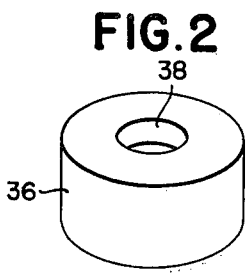
FIG. 2 is an isometric view of a grommet incorporated in the present invention.
Figure 4:
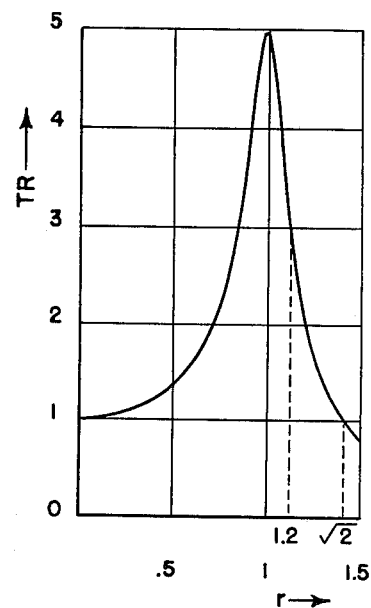
FIG. 4 is a transmissibility plot.

A typical stripper bolt 22 has a head 24 at one end and a shank portion 26 of a predetermined length terminating in a thread 28 at the other end. The shank portion 26 has an annular groove 30 provided medially therein for receipt of a conventional O-ring 32. A washer 34 is disposed around the shank portion 26 in abutting relationship with the head 24 to provide a uniform loading surface for a resilient isolating grommet 36 which may be of an elastomeric material such as rubber. The grommet 36 is of generally cylindrical toroidal configuration as may be seen in FIG. 2 and has a concentric hole 38 provided therein having a slight outward taper 40 to match the clearance hole 20.

Figure 3:
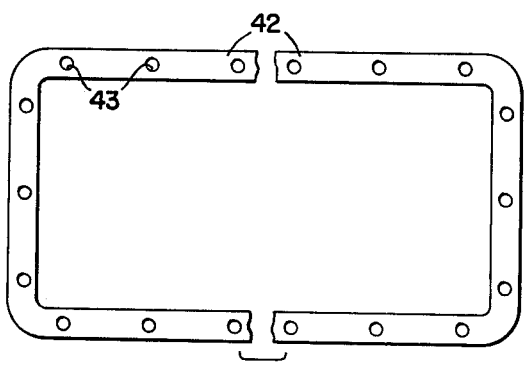
FIG. 3 is a top view of a gasket incorporated in the present invention.

The stripper bolt 22 with the washer 34 and grommet 36 is inserted into the clearance hole 20 of the cover 14 and then through a resilient isolating and sealing gasket 42 which may be of an elastomeric material such as nitrile or silicone rubber. The gasket 42, as may be seen by reference to FIGS. 1 and 3, is of generally rectangular cross-section in the direction perpendicular to the mounting surface 21 and is shaped so as to completely encircle the passageway 16. As may be seen in FIG. 3, the gasket 42 has a plurality of clearance holes 43 provided therein, spaced so as to match the pattern of threaded holes 18 in the base member 12.

As may be seen in FIG. 1, when assembled, the predetermined length of the shank portion 26 of the stripper bolt 22 is slightly less than the uncompressed length of the grommet 36 and the gasket 42 plus the thickness of the washer 34 and the cover 14 so as to cause compression of the grommet 36 and the gasket 42. Further, the O-ring 32 is centrally positioned in the clearance hole 20 of the cover 14 so as to prevent metal to metal contact between the stripper bolt 22 and the cover 14.

To determine the optimum geometrical and physical characteristics of the grommets 36 and the gasket 42, the excitation and/or response frequency spectrum is measured for the base member 12 and/or the cover 14. As would be evident to those skilled in the art, a preferred natural frequency for the cover 14 is selected which will fall between major resonance frequencies while being as low as possible in the frequency spectrum. Where the base member 12 is a vehicle engine, it has been determined that the preferred natural frequency will fall within a range extending from 50 to 350 hertz and thus that the ideal equivalent static system spring rate will be in the range extending from approximately 32,800 seconds $^{-2}$ to 1,613,000 seconds $^{-2}$, times the mass of the cover 14 as derived from the equation:

$$f_n = \frac{1}{2\pi} \sqrt{\frac{aK}{m}}$$

where:

$f_n$ is the natural frequency $a$ is the dynamic system spring rate factor (1 for steel springs) (3 for elastomeric materials)

$K$ is the equivalent static system spring rate which is equal to the sum of the spring rates of the grommets 36 and the gasket 42

$m$ is the mass of the cover 14.

In the preferred embodiment, the preferred natural frequency has been determined to be approximately 100 hertz and and thus the equivalent static system spring rate is 132,000 seconds $^{-2}$ times the mass of the cover 14 from the above equation.

In the ideal situation, to obtain maximum length vibration preference paths, the static spring rates of the grommets 36 should equal that of the gasket 42; i.e. there should be equal spring rates on both sides of the cover 14. Accordingly, the ideal static spring rate would be half the equivalent static system spring rate or in the range of 16,450 seconds $^{-2}$ to 806,500 seconds $^{-2}$ times the mass of the cover 14 and preferably approximately 66,000 seconds $^{-2}$ times the mass of the cover 14.

Starting with the rectangular cross-section gasket 42, and the ideal static spring rate, the effective dimensions and the compressive modulus of elasticity of the gasket 42 are derived from the equation $$k = PWE/T$$

where:
$k =$ is the spring rate of the gasket 42
$P$ is the effective perimeter
$W$ is the width
$E$ is the compressive modulus of elasticity
$T$ is the thickness In the preferred embodiment, P is constrained by the bolt pattern, W by the flange size on the cover 14, E by the desirability of having the softest material possible so as to have the lowest frequency possible, and T by the durometers available and thickness desirable. With particular regard to T, a 10% compression of the gasket 42, regardless of material hardness, will provide a seal which has been experimentally determined to prevent the leakage of a fluid such as oil.

Based on the design criteria for the gasket 42, a new gasket spring rate is calculated which is then used to derive the geometrical and physical characteristics of the cylindrical toroidal grommet 36 according to the equation:

$$k' = \frac{(D^2-d^2)\pi E'N}{4t}$$

where:
$k'$ is the spring rate of the grommet 36
$D$ is the major mean outside diameter
$d$ is the minor means inside diameter
$E'$ is the compressive modulus of elasticity
$N$ is the number of grommets
$t$ is the thickness The spring rate for the grommet 36 is determined with D constrained by the washer diameter, $d$ by the bolt 22 diameter, E' by the desirability of having the softest material possible, and $t$ by the desirability of having equal compression. As would be evident to those skilled in the art, an itterative process yields the closest spring rates based on geometry and durometer.

In the preferred embodiment, it has been determined that a 40 durometer gasket 42 and 70 durometer grommets 36 will provide the most nearly equal spring rates with the softest practical durometers.

While the above is the preferred embodiment, reference should be had to FIG. 5 which shows a transmissibility versus frequency ratio plot for a given material and which defines the permissible deviations from the preferred embodiment. As known to those skilled in the art, transmissibility (TR) is defined as the ratio of transmitted force to impressed force through a material, frequency ratio is defined as the ratio of impressed frequency to natural frequency, and the plot is for material having a specific damping factor ratio which in the preferred embodiment is approximately 0.1. Upon examination of FIG. 5, it will be noted that an inflection of the curve above a frequency ratio of 1 occurs at approximately 1.2. This indicates that a variation in the designed natural frequency from the actual natural frequency of 20% (impressed frequency = 1.2 natural frequency) will result in a system having a transmissibility close to the preferred system. When utilizing the first mentioned equation and solving for spring rate, it will be found by those skilled in the art that the 20% variation in frequency will allow the spring rate of either the gasket 42 or the grommets 38 to be 1.44 or approximately one and one-half times the other without substantially effecting the isolation capabilities of the system.

Upon further examination of FIG. 5, it will be noted that the transmissibility becomes less than 1 at approximately 1.4. This indicates a variation is designed and actual natural frequency beyond which the desired isolation capabilities of the system will be lost. When utilizing the first mentioned equation and solving for spring rate, it will be found by those skilled in the art that a 40% variation in frequency will allow the spring rate of either the gasket 42 or the grommets 36 to be approximately 2 times the other before the desired isolation effect will be lost.

The effect of the shear spring rate in directions perpendicular to the compressive spring rate must be checked to assure that the natural frequency parallel to the mounting surface 21 is not greater than the natural frequency perpendicular thereto in a manner which would be obvious to those skilled in the art. If it is greater, the above calculations must be made to arrive at a design suitable for the vibrations parallel to the mounting surface and a check made of the natural frequency perpendicular to the mounting surface 21 to assure that it has not been increased by the design change.

Referring now to FIG. 5, there is shown an alternate embodiment having a gasket 44 disposed between the cover 14 and the member 12, and with the same numbers as used in the previously described embodiment being used to designate the same parts. As may be seen in FIGS. 5 and 6, the gasket 44 has a generally H-shaped configuration.

In certain instances where it is desirable to utilize the same durometer material for the gasket 44 and the grommets 36, it is possible to obtain substantially equal spring rates by changing the cross-sectional configuration of the gasket or grommets. The same equations as given above will apply except that k and k' will be determined by an equation dependent upon the gasket or grommets' cross-section perpendicular to the surface of the member 12 as would be evident to those skilled in the art. The gasket 44 will provide the substantially same spring rate as the grommets 36 where both are 70 durometer.

Referring now to FIG. 7, therein is shown a further alternate embodiment having a metal spring 46 disposed between the cover 12 and the washer 34, and with the same numbers as used in the previously described embodiments being used to designate the same parts. As would be evident to those skilled in the art, a metal spring 46 would function equally as well as a grommet to provide substantially equal spring rates.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A vibration isolation system comprising: base means; cover means having an outer perimeter for mounting on the base means to cover the base means; securing means having head means for securing the cover means on the base means; a plurality of resilient isolating means disposed around the securing means and between the head means and the cover means having predetermined spring rates therebetween; and resilient isolating sealing material means substantially paralleling the outer perimeter of the cover means disposed between the cover means and the base means having a predetermined spring rate therebetween which is equal to or less than twice the sum of the predetermined spring rates of the plurality of resilient isolating means.

2. The vibration isolation system as claimed in claim 1 wherein the resilient isolating sealing material means is compressed a predetermined percentage of its thickness between the cover means and the base means to prevent the passage of fluid between the resilient isolating sealing material means and the cover means or the base means.

3. The vibration isolation system as claimed in claim 1 wherein the resilient isolating means and the resilient isolating sealing material means have substantially similar cross sections perpendicular to the outer perimeter of the cover means and the compressive modulus of elasticity of the resilient isolating means is substantially different from that of the resilient isolating sealing material means.

4. The vibration isolation system as claimed in claim 1 wherein the resilient isolating means and the resilient isolating sealing material means have substantially dissimilar cross sections perpendicular to the outer perimeter of the cover means and the compressive modulus of elasticity of the resilient isolating means is approximately the same as that of the resilient isolating sealing material means.

5. The vibration isolation system as claimed in claim 1 including further isolating means for isolating the cover means from the securing means.

6. A vibration isolation system comprising: vibratable base means having a mounting surface and passageway means provided therein intersecting the mounting surface; cover means for mounting on the base means to cover the passageway means; a plurality of securing means having head means for securing the cover means to the base means; a plurality of elastomeric isolating means disposed between the head means and the cover means having a predetermined spring rate therebetween; and elastomeric isolating sealing means disposed around the passageway means between the cover means and the base means having a predetermined spring rate therebetween which is within the range of one-half to two times the sum of the predetermined spring rates of the plurality of resilient isolating means.

7. The vibration isolation system as claimed in claim 6 wherein the resilient isolating sealing material means is compressed approximately 10 percent or more of the thickness between the cover means and the base means to prevent the passage of fluid between the resilient isolating sealing material means and the cover means or the base means.

8. The vibration isolation system as claimed in claim 6 wherein the resilient isolating means and the resilient isolating sealing material means have substantially similar cross sections perpendicular to the outer perimeter of the cover means and the compressive modulus of elasticity of the resilient isolating means is substantially different from that of the resilient isolating sealing material means.

9. The vibration isolation system as claimed in claim 6 wherein the resilient isolating means and the resilient isolating sealing material means have substantially dissimilar cross sections perpendicular to the outer perimeter of the cover means and the compressive modulus of elasticity of the resilient isolating means is approximately the same as that of the resilient isolating sealing material means.

10. The vibration isolation system as claimed in claim 6 including further isolating means operatively associated with the resilient isolating means and the resilient sealing isolating material means isolating the cover means from the base means and the securing means in directions parallel to the mounting surface for maintaining natural frequencies of the cover parallel to the mounting surface lower than the natural frequency of the cover perpendicular to the mounting surface.

11. A vibration isolation system comprising: base means; cover means having an outer perimeter for mounting on the base means to cover the base means; securing means having head means for securing the cover means on the base means; a plurality of resilient isolating means disposed around the securing means and between the head means and the cover means having predetermined spring rates therebetween; and resilient isolating sealing material means substantially paralleling the outer perimeter of the cover means disposed between the cover means and the base means having a predetermined spring rate therebetween which is equal to or less than one and one-half times the sum of the predetermined spring rates of the plurality of resilient isolating means.

12. The vibration isolation system as claimed in claim 11 wherein the resilient isolating sealing material means is compressed a predetermined percentage of its thickness between the cover means and the base means to prevent the passage of fluid between the resilient isolating sealing material means and the cover means or the base means.

13. The vibration isolation system as claimed in claim 11 wherein the resilient isolating means and the resilient isolating sealing material means have substantially similar cross sections perpendicular to the outer perimeter of the cover means and the compressive modulus of elasticity of the resilient isolating means is substantially different from that of the resilient isolating sealing material means.

14. The vibration isolating system as claimed in claim 11 wherein the resilient isolating means and the resilient isolating sealing material means have substantially dissimilar cross sections perpendicular to the outer perimeter of the cover means and the compressive modulus of elasticity of the resilient isolating means is approximately the same as that of the resilient isolating sealing material means.

15. The vibration isolation system as claimed in claim 11 including further isolating means for isolating the cover means from the securing means.

16. A vibration isolation system comprising: vibratable base means having a mounting surface and passageway means provided therein intersecting the mounting surface; cover means for mounting on the base means to cover the passageway means; a plurality of securing means having head means for securing the cover means to the base means; a plurality of elastomeric isolating means disposed between the head means and the cover means having a predetermined spring rate therebetween; and elastomeric isolating sealing means disposed around the passageway means between the cover means and the base means having a predetermined spring rate therebetween which is within the range of two-thirds to one and one-half times the sum of the predetermined spring rates of the plurality of elastomeric isolating means.

17. The vibration isolation system as claimed in claim 16 wherein the resilient isolating sealing material means is compressed approximately 10 percent or more of the thickness between the cover means and the base means to prevent the passage of fluid between the resilient isolating sealing material means and the cover means or the base means.

18. The vibration isolation system as claimed in claim 16 wherein the resilient isolating means and the resilient isolating sealing material means have substantially similar cross sections perpendicular to the outer perimeter of the cover means and the compressive modulus of elasticity of the resilient isolating means is substantially different from that of the resilient isolating sealing material means.

19. The vibration isolation system as claimed in claim 16 wherein the resilient isolating means and the resilient isolating sealing material means have substantially dissimilar cross sections perpendicular to the outer perimeter of the cover means and the compressive modulus of elasticity of the resilient isolating means is approximately the same as that of the resilient isolating sealing material means.

20. The vibration isolation system as claimed in claim 16 including further isolating means operatively associated with the resilient isolating means and the resilient isolating sealing material means isolating the cover means from the base means and the securing means in directions parallel to the mounting surface for maintaining natural frequencies of the cover parallel to the mounting surface lower than the natural frequency of the cover perpendicular to the mounting surface.

21. A vibration isolation system comprising: base means; cover means having an outer perimeter for mounting on the base means to cover the base means; securing means having head means for securing the cover means on the base means; a plurality of resilient isolating means disposed around the securing means and between the head means and the cover means having predetermined spring rates therebetween; and resilient isolating sealing material means substantially paralleling the outer perimeter of the cover means disposed between the cover means and the base means having a predetermined spring rate therebetween which is equal to the sum of the predetermined spring rates of the plurality of resilient isolating means.

22. The vibration isolation system as claimed in claim 21 wherein the resilient isolating sealing material means is compressed a predetermined percentage of its thickness between the cover means and the base means to prevent the passage of fluid between the resilient isolating sealing material means and the cover means or the base means.

23. The vibration isolation system as claimed in claim 21 wherein the resilient isolating means and the resilient isolating sealing material means have substantially similar cross sections perpendicular to the outer perimeter of the cover means and the compressive modulus of elasticity of the resilient isolating means is substantially different from that of the resilient isolating sealing material means.

24. The vibration isolation system as claimed in claim 21 wherein the resilient isolating means and the resilient isolating sealing material means have substantially dissimilar cross sections perpendicular to the outer perimeter of the cover means and the compressive modulus of elasticity of the resilient isolating means is approximately the same as that of the resilient isolating sealing material means.

25. The vibration isolation system as claimed in claim 21 including further isolating means for isolating the cover means from the securing means.

26. A vibration isolation system comprising: vibratable base means having a mounting surface and passageway means provided therein intersecting the mounting surface; cover means for mounting on the base means to to cover the passageway means; a plurality of securing means having head means for securing the cover means to the base means; a plurality of elastomeric isolating means disposed between the head means and the cover means having a predetermined spring rate therebetween; and elastomeric isolating sealing means disposed around the passageway means between the cover means and the base means having a predetermined spring rate therebetween which is equal to the sum of the predetermined spring rates of the plurality of resilient isolating means.

27. The vibration isolation system as claimed in claim 26 wherein the resilient isolating sealing material means is compressed approximately 10 percent or more of the thickness between the cover means and the base means to prevent the passage of fluid between the resilient isolating sealing material means and the cover means or the base means.

28. The vibration isolation system as claimed in claim 26 wherein the resilient isolating means and the resilient isolating sealing material means have substantially similar cross sections perpendicular to the outer perimeter of the cover means and the compressive modulus of elasticity of the resilient isolating means is substantially different from that of the resilient isolating sealing material means.

29. The vibration isolation system as claimed in claim 26 wherein the resilient isolating means and the resilient isolating sealing material means have substantially dissimilar cross sections perpendicular to the outer perimeter of the cover means and the compressive modulus of elasticity of the resilient isolating means is approximately the same as that of the resilient isolating sealing material means.

30. The vibration isolation system as claimed in claim 26 including further isolating means operatively associated with the resilient isolating means and the resilient isolating sealing material means isolating the cover means from the base means and the securing means in directions parallel to the mounting surface for maintaining natural frequencies of the cover parallel to the mounting surface lower than the natural frequency of the cover perpendicular to the mounting surface.

31. In an internal combustion power plant, a cover vibration isolation system comprising: an engine having an opening provided therein and a plurality of threaded holes provided therein around the periphery of the opening; a cover configured to cover the opening and having a plurality of clearance holes provided therein matching the threaded holes in the engine; a plurality of stripper bolts extending through the clearance holes in the cover and threaded into the threaded holes in the engine, each of said plurality of stripper bolts having an annular groove provided therein proximate to and concentric with the clearance holes; a plurality of resilient O-rings disposed partially in the annular grooves isolating each of the plurality of stripper bolts from the cover; a plurality of resilient grommets encircling each of the plurality of stripper bolts between the bolt head and the cover, said each of said plurality of grommets compressed a predetermined distance by threading of the stripper bolts into the engine and having a predetermined spring rate between the bolt head and the cover; and a resilient gasket sealingly encircling the periphery of the opening between the cover and the engine, said gasket having a plurality of clearance holes provided therein matching the clearance holes in the cover, each hole encircling one of the plurality of stripper bolts, said gasket having predetermined spring rate between the cover and the engine which is equal to or less than twice the sum of the predetermined spring rates of the plurality of grommets.

32. The cover vibration isolation system as claimed in claim 31 wherein the resilient gasket is compressed approximately 10 percent or more of its thickness between the cover and the engine to prevent the leakage of oil between the gasket and the cover or the engine.

33. The cover vibration isolation system as claimed in claim 31 wherein the resilient isolating means and the resilient isolating sealing material means have substantially similar cross sections perpendicular to the outer perimeter of the cover means and the compressive modulus of elasticity of the resilient isolating means is substantially different from that of the resilient isolating sealing material means.

34. The cover vibration isolation system as claimed in claim 31 wherein the resilient isolating means and the resilient isolating sealing material means have substantially dissimilar cross sections perpendicular to the outer perimeter of the cover means and the compressive modulus of elasticity of the resilient isolating means is approximately the same as that of the resilient isolating sealing material means.

35. The cover vibration isolation system as claimed in claim 31 wherein each of said plurality of stripper bolts has an annular groove provided therein proximate to and concentric with the clearance holes in the cover cooperating with the gasket and grommets to maintain a natural frequency of the cover perpendicular to the axis of the stripper bolts which is lower than the natural frequency of the cover parallel to the axis of the stripper bolts.

36. The cover vibration isolation system as claimed in claim 31 wherein the grommets have a total predetermined spring rate within the range of 16,450 seconds $^{-2}$ to 806,500 seconds $^{-2}$ times the mass of the cover.

37. The cover vibration isolation system as claimed in claim 31 wherein the gasket has a predetermined spring rate within the range of 16,450 seconds $^{-2}$ to 806,500 seconds $^{-2}$ times the mass of the cover.

38. The cover vibration isolation system as claimed in claim 31 wherein the predetermined spring rate of the grommets is substantially equal to 66,000 seconds $^{-2}$ times the mass of the cover.

39. In an internal combustion power plant, a cover vibration isolation system comprising: an engine having an oil opening provided therein and a plurality of threaded holes provided therein around the periphery of the opening; a cover configured to cover the opening and having a plurality of clearance holes provided therein matching the threaded holes in the engine; a plurality of stripper bolts extending through the clearance holes in the cover and threaded into the threaded holes in the engine, each of said plurality of stripper bolts having an annular groove provided therein proximate to and concentric with the clearance holes; a plurality of resilient O-rings disposed partially in the annular grooves isolating each of the plurality of stripper bolts from the cover; a plurality of resilient grommets encircling each of the plurality of stripper bolts between the bolt head and the cover, said each of said plurality of grommets compressed in a predetermined distance by threading of the stripper bolts into the engine and having a predetermined spring rate between the bolt head and the cover; and a resilient gasket sealingly encircling the periphery of the opening between the cover and the engine, said gasket having a plurality of clearance holes provided therein matching the clearance holes in the cover, each hole encircling one of the plurality of stripper bolts, said gasket having predetermined spring rate between the cover and the engine which is within the range of two-thirds to one and one-half times the sum of the predetermined spring rates of the plurality of grommets.

40. The cover vibration isolation system as claimed in claim 39 wherein the resilient gasket is compressed approximately 10 percent or more of its thickness between the cover and the engine to prevent the leakage of oil between the gasket and the cover or the engine.

41. The cover vibration isolation system as claimed in claim 39 wherein the resilient isolating means and the resilient isolating sealing material means have substantially similar cross sections perpendicular to the outer perimeter of the cover means and the compressive modulus of elasticity of the resilient isolating means is substantially different from that of the resilient isolating sealing material means.

42. The cover vibration isolation system as claimed in claim 39 wherein the resilient isolating means and the resilient isolating sealing material means have substantially dissimilar cross sections perpendicular to the outer perimeter of the cover means and the compressive modulus of elasticity of the resilient isolating means is approximately the same as that of the resilient isolating sealing material means.

43. The cover vibration isolation system as claimed in claim 39 wherein each of said plurality of stripper bolts has an annular groove provided therein proximate to and concentric with the clearance holes in the cover cooperating with the gasket and grommets to maintain a natural frequency of the cover perpendicular to the axis of the stripper bolts which is lower than the natural frequency of the cover parallel to the axis of the stripper bolts.

44. The cover vibration isolation system as claimed in claim 39 wherein the grommets have a total predetermined spring rate within the range of 16,450 seconds $^{-2}$ to 806,500 seconds $^{-2}$ times the mass of the cover.

45. The cover vibration isolation system as claimed in claim 39 wherein the gasket has a predetermined spring rate within the range of 16,450 seconds $^{-2}$ to 806,500 seconds $^{-2}$ times the mass of the cover.

46. The cover vibration isolation system as claimed in claim 39 wherein the predetermined spring rate of the grommet is substantially equal to 66,000 seconds $^{-2}$ times the mass of the cover.

47. In an internal combustion power plant, a cover vibration isolation system comprising: an engine having an opening provided therein and a plurality of threaded holes provided therein around the periphery of the opening; a cover configured to cover the opening and having a plurality of clearance holes provided therein matching the threaded holes in the engine; a plurality of stripper bolts extending through the clearance holes in the cover and threaded into the threaded holes in the engine, each of said plurality of stripper bolts having an annular groove provided therein proximate to and concentric with the clearance holes; a plurality of resilient O-rings disposed partially in the annular grooves isolating each of the plurality of stripper bolts from the cover; a plurality of resilient grommets encircling each of the plurality of stripper bolts between the bolt head and the cover, said each of said plurality of grommets compressed a predetermined distance by threading of the stripper bolts into the engine and having a predetermined spring rate between the bolt head and the cover; and a resilient gasket sealingly encircling the periphery of the opening between the cover and the engine, said gasket having a plurality of clearance holes provided therein matching the clearance holes in the cover, each hole encircling one of the plurality of stripper bolts, said gasket having predetermined spring rate between the cover and the engine which is equal to the sum of the predetermined spring rates of the plurality of grommets.

48. The cover vibration isolation system as claimed in claim 47 wherein the resilient gasket is compressed approximately 10 percent or more of the thickness between the cover and the engine to prevent the leakage of oil between the gasket and the cover or the engine.

49. The cover vibration isolation system as claimed in claim 47 wherein the resilient isolating means and the resilient isolating sealing material means have substantially similar cross sections perpendicular to the outer perimiter of the cover means and the compressive modulus of elasticity of the resilient isolating means is substantially different from that of the resilient isolating sealing material means.

50. The cover vibration isolation system as claimed in claim 47 wherein the resilient isolating means and the resilient isolating sealing material means have substantially dissimilar cross sections perpendicular to the outer perimeter of the cover means and the compressive modulus of elasticity of the resilient isolating sealing material means.

51. The cover vibration isolation system as claimed in claim 47 wherein each of said plurality of stripper bolts has an annular groove provided therein proximate to and concentric with the clearance holes in the cover cooperating with the gasket and grommets to maintain a natural frequency of the cover perpendicular to the axis of the stripper bolts which is lower than the natural frequency of the cover parallel to the axis of the stripper bolts.

52. The cover vibration isolation system as claimed in claim 47 wherein the grommets have a total predetermined spring rate within the range of 16,450 seconds $^{-2}$ power to 806,500 seconds $^{-2}$ times the mass of the cover.

53. The cover vibration isolation system as claimed in claim 47 wherein the gasket has a predetermined spring rate within the range 16,450 seconds $^{-2}$ power to 806,500 seconds $^{-2}$ times the mass of the cover.

54. The cover vibration isolation system as claimed in claim 47 wherein the predetermined spring rate of the grommet is substantially equal to 66,000 seconds $^{-2}$ times the mass of the cover.

* * * * *